US009500493B2

(12) United States Patent
Gerlach

(10) Patent No.: US 9,500,493 B2
(45) Date of Patent: Nov. 22, 2016

(54) SITUATION-AWARE ROUTE AND DESTINATION PREDICTIONS

(71) Applicants: Volkswagen Aktiengesellschaft, Wolfsburg (DE); Audi AG, Ingolstadt (DE)

(72) Inventor: Simon Gerlach, Hannover (DE)

(73) Assignees: Volkswagen Aktiengesellschaft, Wolfsburg (DE); Audi AG, Ingolstadt (DE)

( * ) Notice: Subject to any disclaimer, the term of this patent is extended or adjusted under 35 U.S.C. 154(b) by 44 days.

(21) Appl. No.: 14/299,554

(22) Filed: Jun. 9, 2014

(65) Prior Publication Data
US 2015/0354978 A1 Dec. 10, 2015

(51) Int. Cl.
G01C 21/36 (2006.01)
G06F 17/30 (2006.01)
G06N 99/00 (2010.01)
G08G 1/0968 (2006.01)

(52) U.S. Cl.
CPC ..... G01C 21/3617 (2013.01); G06F 17/30241 (2013.01); *G01C 21/362* (2013.01); *G06N 99/005* (2013.01); *G08G 1/096838* (2013.01); *G08G 1/096894* (2013.01)

(58) Field of Classification Search
USPC ........................................................ 701/424
See application file for complete search history.

(56) References Cited

U.S. PATENT DOCUMENTS

| 7,233,861 B2 | 6/2007 | Van Buer et al. | |
| 7,487,017 B1 | 2/2009 | Bell et al. | |
| 7,788,027 B2* | 8/2010 | Jones | G01C 21/26 701/301 |
| 8,392,116 B2* | 3/2013 | Lehmann | G01C 21/3438 340/991 |
| 8,775,080 B2* | 7/2014 | Mizuno | G01C 21/3617 701/521 |
| 2005/0125148 A1* | 6/2005 | Van Buer | G01C 21/3617 701/468 |
| 2007/0005235 A1* | 1/2007 | Suzuki | G01C 21/3617 701/532 |
| 2007/0073477 A1* | 3/2007 | Krumm | G01C 21/3617 701/423 |
| 2008/0027639 A1* | 1/2008 | Tryon | B60K 6/46 701/533 |
| 2009/0192705 A1* | 7/2009 | Golding | G01C 21/3484 701/533 |
| 2010/0106603 A1* | 4/2010 | Dey | G01C 21/3484 705/14.63 |
| 2011/0238289 A1* | 9/2011 | Lehmann | G01C 21/3438 701/533 |
| 2012/0310534 A1* | 12/2012 | Mizuno | G01C 21/3617 701/540 |
| 2013/0166096 A1* | 6/2013 | Jotanovic | G01C 21/3617 701/1 |
| 2013/0173150 A1* | 7/2013 | Ghisio | G01C 21/26 701/423 |
| 2014/0279723 A1* | 9/2014 | McGavran | G06N 99/005 706/11 |

FOREIGN PATENT DOCUMENTS

WO WO 2007/067842 A2 6/2007

* cited by examiner

*Primary Examiner* — Jason Holloway
(74) *Attorney, Agent, or Firm* — Muncy, Geissler, Olds & Lowe, P.C.

(57) ABSTRACT

A method for predicting a destination of a vehicle includes receiving vehicle data from a plurality of sensors, the vehicle data including at least a current location and a current time, determining a plurality of usage scenarios based on the vehicle data, accessing historical vehicle data and user data from a database, assigning, based on the vehicle data, a likelihood value to each of the plurality of usage scenarios, and predicting a set of destinations and routes for each of the plurality of usage scenarios.

6 Claims, 4 Drawing Sheets

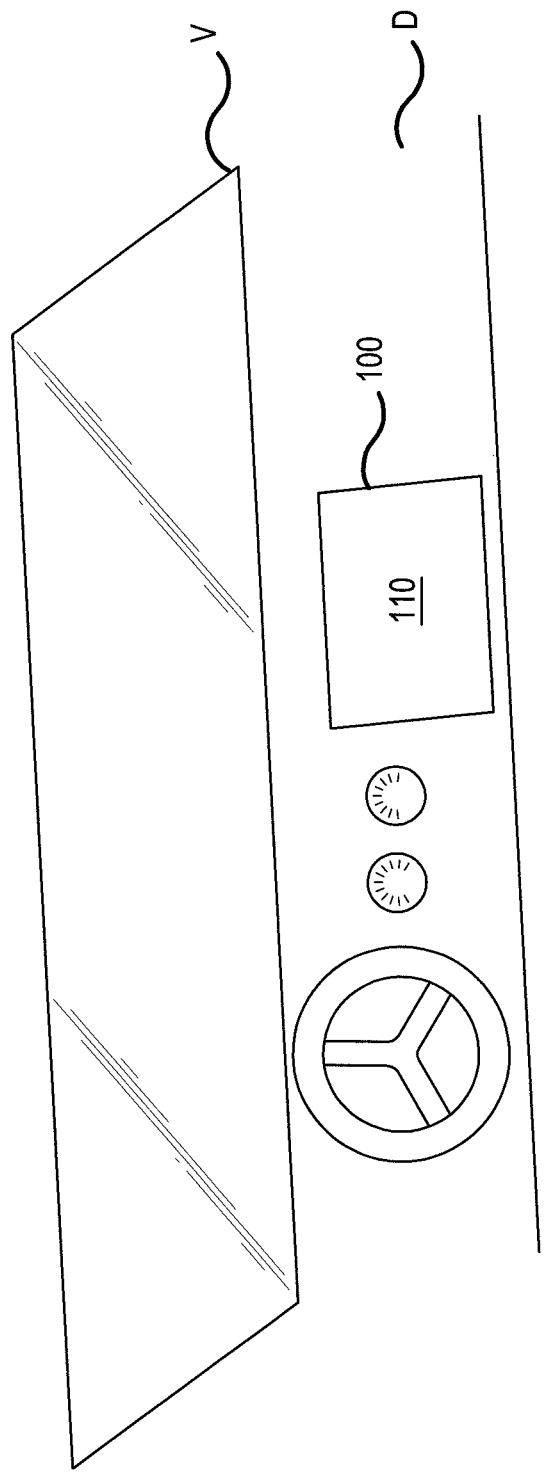

SITUATION-AWARE ROUTE AND DESTINATION PREDICTIONS

BACKGROUND OF THE INVENTION

1. Field of the Invention

The present invention relates to vehicle navigation systems and more particularly to a vehicle navigation system enabled to predict a vehicle destination and/or route.

2. Description of the Background Art

There is currently a need for vehicle navigation systems to be able to make predictions regarding, for example, a vehicle's destination and/or route to the destination. The customer experience of a system that predicts its action is highly dependent on the reliability of the predictions. The predictions must be accurate and quickly available.

Typically, such predictions are determined based on comparing a current trip with recorded trip patterns driven in the past. If the current trip matches a historic trip pattern, then the destination/route of the historic trip is proposed to the user. The likelihood of historic trips are calculated based on comparing the current location and/or heading and the current time (e.g., time of day, day of week, etc.) to the recorded trip patterns. Instead of considering just the current position, these mechanisms take the driven route so far into account (or a part of it like the last mile) and compare it to the recorded trip pattern.

For example, U.S. Patent Application Publication No. 2013/0166096 discloses a predictive destination entry system for a vehicle navigation system. The system uses a memory for storing data related to prior driving history or habits. The system makes vehicle destination predictions based on the historical driving data.

Somewhat similarly, WO 2007/067842 discloses a vehicle navigation system that saves addresses corresponding to vehicle destinations along with parameters related to the addresses. The navigation system uses the parameters to predict a destination by comparing the present state of the vehicle to the saved parameters. The system also considers traffic conditions in determining possible routes to the predicted destination.

Furthermore, U.S. Pat. No. 7,233,861 discloses a system for predicting vehicle destinations. The system compares current vehicle position data to vehicle position data for a previous trip to predict a destination for the vehicle. The system then proposes a route to the predicted destination.

Additionally, U.S. Pat. No. 7,487,017 discloses a predictive navigation system. The system obtains route information traveled by the vehicle. The route information includes a starting location, a destination location, and one or more decision points along the route. The route information is used to create a neural network, which the system then uses to predict current potential routes.

Most trips, however, begin at the same location (e.g. home, work) going to the same direction (e.g. freeway entrance) often at about the same time (e.g. leaving home in the morning, heading to the freeway). If only time and location are used, the system cannot distinguish between destinations/routes that are usually driven at the same time and begin with the same path. Until an intersection or exit is reached where the paths differ, the system might decide to display just a most likely destination/route (e.g., the destination/route that was driven most often). This approach, however, can lead to incorrect predictions being shown for a long time and, therefore, lead to poor results and limited user benefit. The above conventional techniques each suffer from this problem.

Certain conventional techniques have addressed this problem by predicting destinations based on searches that were conducted in the past (e.g., this is the Google Now approach). If a user searched for "gas station" or "best deal on gas in San Mateo," then the system will predict suitable destinations in the area. Other conventional techniques connect to a user's mobile phone or Internet device to access the user's calendar or address book to find information regarding a next likely destination. Similarly, some systems access online event calendars and match events in the calendar with the user's interests to predict likely destinations.

Furthermore, certain known approaches have a limited ability to take into account current fuel/energy levels or remaining fuel/energy range when predicting destinations/ routes. This information is used to suppress predictions that are not in the current range. If the car is low on fuel, then the system can propose likely routes to gas stations to user (i.e., predicting the situation "fill up the car.") Other situations, however, cannot be distinguished and are not taken into account when determining the predictions.

SUMMARY OF THE INVENTION

There are several common situations in which the most common trip pattern of a certain user is disrupted because of exceptional situations or spontaneous user decisions. The conventional techniques above cannot sufficiently account for these situations. Indeed, the existing prediction algorithms cannot provide suitable predictions in these situations since the actual destination does not match the most common destination driven and also cannot be derived from external data sources like the user's calendar or an online calendar event.

The inventors have discovered that in order to achieve better predictions from the beginning, the prediction algorithm should consider more data in addition to the location and time of the vehicle. Specifically, the inventors have discovered that such situations can be detected by using current and historic reading from in-vehicle sensors.

In view of the foregoing and other exemplary problems, drawbacks, and disadvantages of the conventional methods and structures, an exemplary feature of the present invention is to provide a system and method that more accurately predicts a vehicle destination and/or route using complex sensor data fusion to consider more vehicle data in addition to the location and time.

According to a first non-limiting, exemplary aspect of the invention, a method for predicting a destination of a vehicle includes receiving vehicle data from a plurality of sensors, the vehicle data including a current location of the vehicle, determining a plurality of usage scenarios based on the vehicle data, accessing historical vehicle data and user data from a database, assigning, based on the vehicle data, a likelihood value to each of the plurality of usage scenarios, and predicting a set of destinations and routes for each of the plurality of usage scenarios.

According to a second non-limiting, exemplary embodiment a system includes a sensor configured to detect vehicle data, a situation detection unit configured to receive the vehicle data from the sensor and to determine a plurality of common usage scenarios based on the vehicle data, the situation detection unit configured to determine and assign a likelihood value for the plurality of common usage scenarios, and a navigation system control unit configured to receive the vehicle data from the sensor and the plurality of common usage scenarios and the likelihood value from the situation detection unit, wherein the navigation system control unit is configured to determine a set of destinations for the common usage scenarios.

Also, in accordance with certain aspects of the invention, data about the car's environment like ambient temperature or temperature at the likely destination, traffic situation etc. can be taken into account when making predictions. Although one usecase is directed to predicting a set of destinations and routes, the method/system is also able to predict additional information including, for example, climate settings, radio stations, the most likely person to call, etc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, do not limit the present invention, and wherein:

FIG. 1 illustrates a vehicle V incorporating a system according to certain exemplary embodiments of the present invention;

DETAILED DESCRIPTION

Figure 2A:
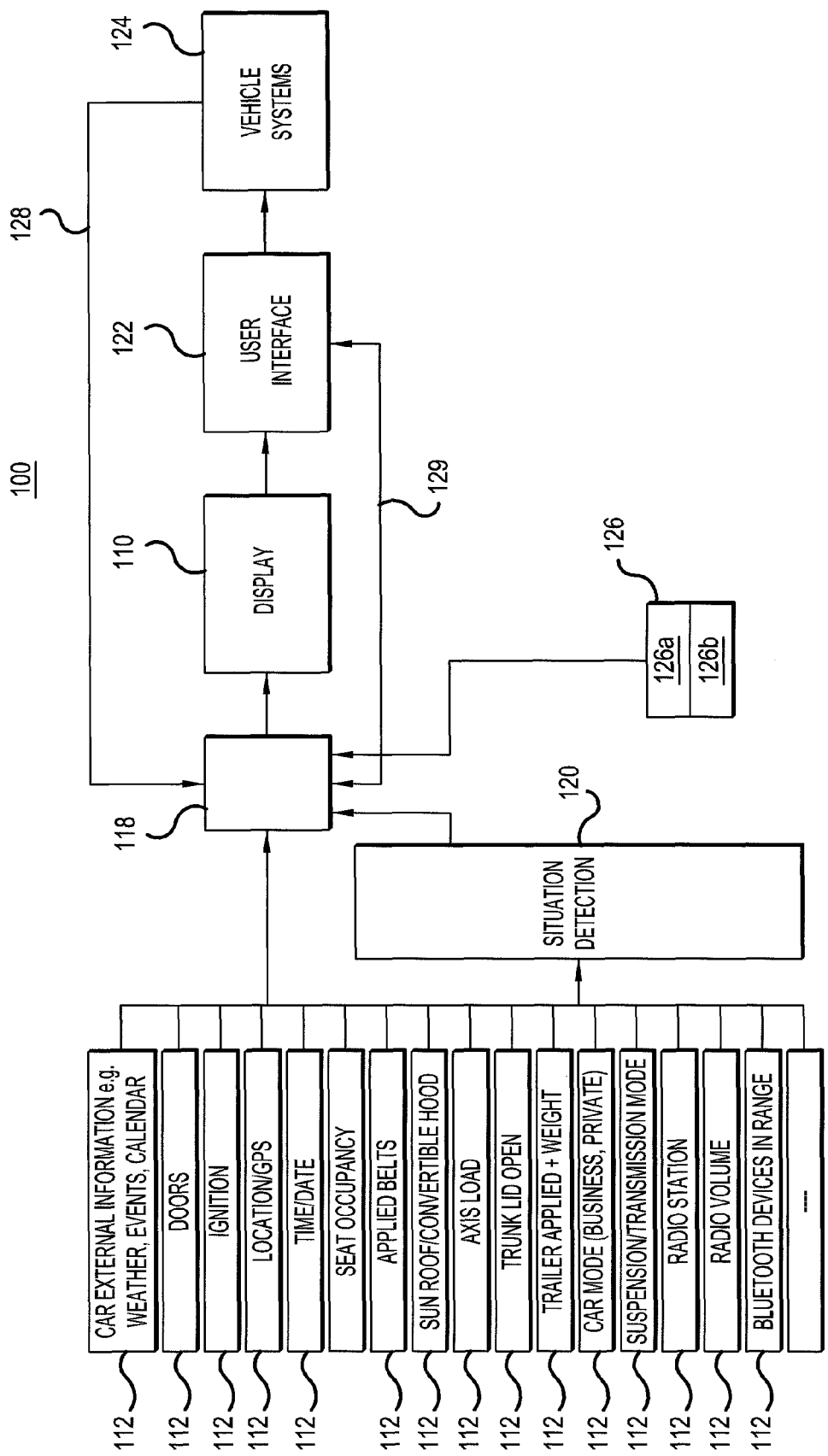
FIG. 2A illustrates the system according to certain exemplary embodiments of the present invention.
Figure 2B:
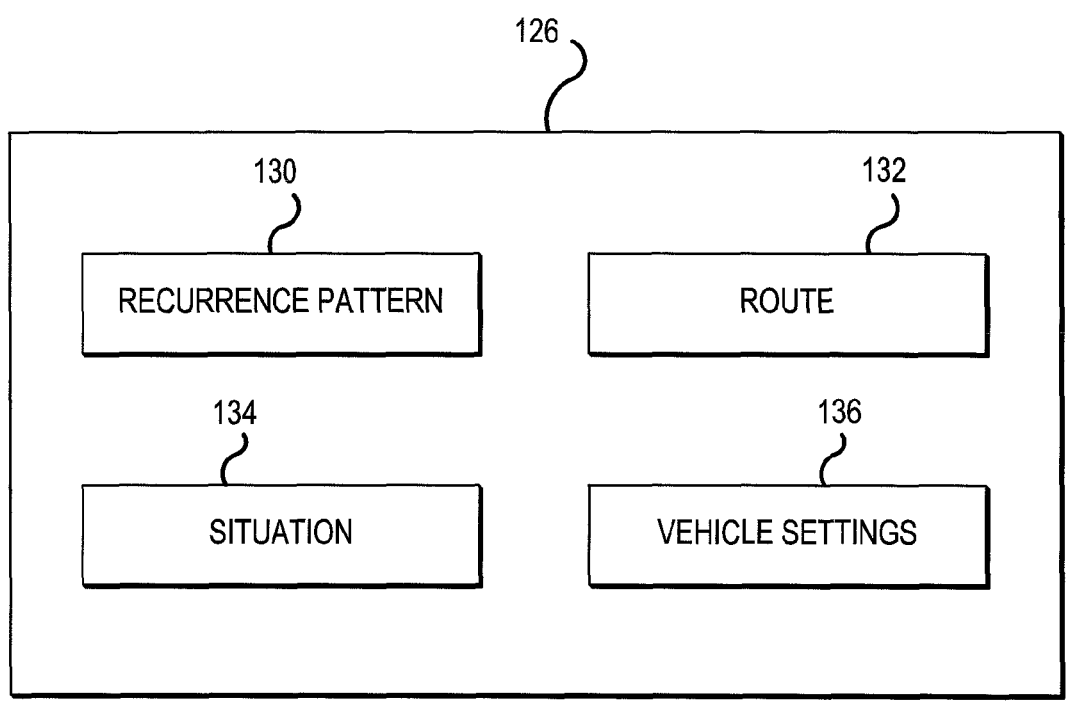
FIG. 2B illustrates the historical database of the system in FIG. 2A.
Figure 3:
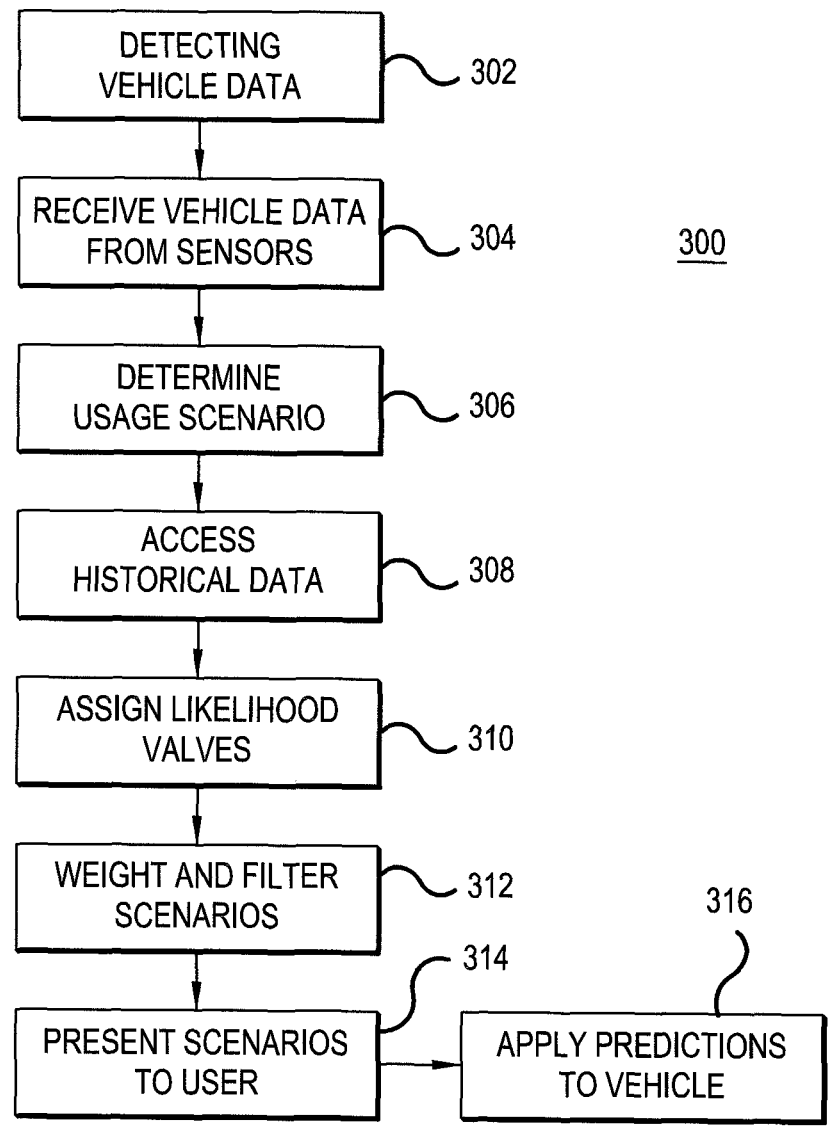
FIG. 3 illustrates a method according to certain exemplary embodiments of the present invention.

Referring now to the drawings, and more particularly to FIGS. 1-3, there are shown exemplary embodiments of the method and structures according to the present invention.

As detailed above, certain conventional techniques attempt to predict destinations by comparing time and location with recorded historic trips. There are several common situations, however, in which the most common trip pattern of a certain user is disrupted because of exceptional situations or spontaneous user decisions.

For example, a user may be member of a chain of gyms and usually goes to the gym after work every Tuesday. However, depending on the traffic he will go to either the branch next to his office or the one next to his home. By taking the current day of the week and the traffic situation into account, these situations can be detected and suitable destinations can be predicted.

Alternatively, the user may typically drive to work while the user's children are usually driven to school by the user's spouse. Once in a while, however, the user will drive the children to school before going to work. This situation can be detected by checking the seat occupancy sensor.

In another example, a user may be going on a camping trip to his/her preferred camp ground every week. This usage scenario can be distinguished from other trips by checking if a trailer is applied.

Lastly, a user may sometimes be involved in a carpooling endeavor in which the user picks up colleagues on the way to work and/or drives the colleagues home after work. This scenario might be detected, for example, by watching the mobile devices in the car during the trip.

The system and method described in detail below are able to more accurately predict a vehicle destination and/or route in situations like those described above by using complex sensor data fusion to consider more vehicle data in addition to the location of the vehicle and the current time.

FIG. 1 illustrates a dashboard D in the interior of a vehicle V. According to certain exemplary embodiments of the invention, the present method and system may be incorporated into a vehicle navigation system 100. Alternatively, the present method and system 100 may be embodied as a separate designated system that communicates with the vehicle navigation system and/or other vehicle systems.

FIG. 2 illustrates the system 100 according to certain exemplary embodiments of the invention in more detail. The system includes one or more sensors. In the exemplary embodiment illustrated in FIG. 2, the system includes a plurality of sensors 112. The plurality of sensors 112 include sensors configured to detect vehicle external information (e.g., weather, events, calendar, etc.), whether the doors are open, closed and/or locked, vehicle ignition status, location/GPS, current time/date, etc. Furthermore, the plurality of sensors 112 include sensors configured to detect passenger usage parameters of the vehicle. For example, the plurality of sensors 112 may detect seat occupancy, whether seat belts are applied, sun roof/convertible roof status, axle load, whether trunk is open/closed, whether trailer is applied and weight of load, car mode (business/private), suspension/transmission mode, radio station, radio volume, blue device status, etc.

The sensors 112 are configured to transmit detected data to a situation detection unit 120. Based on the variety of data from the plurality of sensors, the situation detection unit 120 is configured to determine one or more potential usage scenarios and also determine and assign a likelihood value to each potential usage scenario.

The system includes a system control unit 118. The control unit 118 is configured to receive data from the plurality of sensors 112 and the potential usage scenarios and likelihood values from the situation detection unit 120. Based on the potential usage scenarios, likelihood values and sensor data, the control unit 118 is configured to determine a set of destinations and/or routes for each potential usage scenario. Additionally, the control unit 118 is configured to weight the likelihood of each destination and/or route for each potential usage scenario. That is, each prediction is weighted with a likelihood of matching the current situation. The control unit 118 is configured to then filter all predictions that have a weighted value below a certain threshold and identify the most likely weighted prediction over all situations. That is, the control unit 118 is configured to identify the most likely destination/route based on the likelihood value for each potential usage scenario and the likelihood value for each destination/route.

The system 100 also includes a historical database 126. The historical database 126 stores vehicle and usage data from previous vehicle trips. The control unit 118 is configured to communicate with the historical database 126 and to use stored historical data when weighting the likelihood of the predictions. For example, if a user has brought someone from a certain place to another place (e.g. bring kids home to school), it is more likely that later that day the user will pick that person up and bring them back to the original starting point.

The control unit 118 sends the mostly likely prediction (or a set of most likely potential predictions that have a weighted likelihood value above the threshold) to a system display 110, which presents the prediction or set of predictions to the user. The display 110 may include a dashboard mounted display (as in FIG. 1) or may include a center console display, a steering wheel mounted display, an overhead display, a windshield embedded display, and/or a display oriented in or near the vehicle instrument cluster (i.e., speedometer, etc.). The display 110 may be a separate designated display or may be incorporated into the vehicle infotainment system display.

The user, through a user interface 122, is able to confirm or reject the predictions on the display. The user interface 122 may be a separate designated interface or may be incorporated into the vehicle infotainment system. Additionally, the user interface 122 may include a touch surface on the display 110, a toggle, an alphanumeric keypad, or any other suitable user interface device and may be positioned in the center console, the steering wheel or any other suitable position in the vehicle passenger compartment.

Once a user confirms a prediction, the prediction is applied to the other vehicle systems 124. That is, the system 100 applies the settings associated with the confirmed usage scenario, destination and route to the vehicle systems 124. The other vehicle systems 124 may include guidance to destination/route, radio station/media track, car mode (business/personal), suspension/transmission mode, etc. Thus, in addition to taking over the destination/route guidance in the in-vehicle navigation system and warning of traffic congestion, there are several other follow up actions possible once the car predicts a destination/route (and/or this has been confirmed by the user). For example, the system can restore the radio station or music title played on the current trip from the last time the same trip was driven. Also, the system can restore other car settings like climate, sun roof position, suspension or transmission mode, etc. Incidents that happened to a new destination are sampled/detected and fed back along a feedback loop 128 to the control unit 118 and then to the historical database 126.

The historical database 126 also stores previous predictions and a reliability value assigned to the previous situations/predictions. If a user confirms a prediction, the reliability of the current usage situation stored in the historical database is raised for future reference. The historical database 126 includes two databases therein. Specifically, the historical database includes a short term database 126a and a long term database 126b.

FIG. 2B further illustrates the structure of the historical database 126. The historical database 126 stores recurrence patterns 130. Here, the smallest recurring pattern is determined (e.g., every day, every second day, every Monday, etc.). The patterns are matched with current date and time.

The historical database 126 also stores route information 132. If not recurring pattern can be detected, the number the destination was selected is saved (for selected period of time, e.g., for three months). This information is matched with a current position and driven path. Additionally, the historical database stores data for specific situations 134, which matches the situations and their likelihood.

The historical database 126 also stores vehicle settings 136. The vehicle settings include, for example, radio, music, climate, etc.

FIG. 3 illustrates a method 300 according to certain exemplary embodiments of the present invention. First, data is detected 302 using the sensors 112. The situation detection unit 120 receives the data 304 from the sensors 112. Then, the potential common usage scenarios are determined 306. Historical data is then accessed 308. A likelihood value is assigned to each prediction 308. Then, a weighted likelihood value is assigned to each prediction based on the data from the vehicle sensors and the historical data and the predictions are filtered based on the weighted likelihood value 312. The mostly likely predictions are then presented to a user 314. Once the user confirms a prediction, the prediction is applied to the vehicle systems 316.

According to the system described above, the vehicle V and the system 100 use a variety of built-in sensors to determine the likelihood of certain common usage scenarios (e.g., commuting, car sharing, joyride/road trip, shopping, delivery, driving children, driving home, etc.). For example, the system, and the plurality of sensors, can be used to distinguish the following exemplary scenarios.

For example, seat occupancy/weight sensors can be used to distinguish between back (likely children) and front row (likely adults) passengers and take the individual weight of the person sitting in the seat into account to determine the likely passengers in the car and, thus, the likely vehicle usage scenario. That is, if seat occupancy/weight sensors determine that the vehicle passenger is likely a child, then depending on the location of the vehicle and the time, the system 100 may determine that the most likely usage scenario is that the user is driving the children to school.

In another example, the door/trunk and/or axle load sensors can determine whether passengers have entered the vehicle or a load has been placed in the car. For example, if the sensors detect that the door/trunk has been opened, but the sensors also detect that seat occupancy did not change, then the system can use this information as an indicator that a load was put into the vehicle. This can also be determined by checking for changes in the axial load. Additionally, the sensors can determine whether the seat belts are applied. If the seat belt is applied, it is likely that the additional weight in the vehicle is a passenger. If the seat belt is not applied, it is likely that the additional weight is likely cargo.

Furthermore, the system may scan for mobile devices (e.g., via Bluetooth (wireless technology) or WLAN) in the car. With this information, the system can recognize specific passengers in the vehicle. Based on historical data, the system may be able to predict certain trips that are only driven with certain passenger combinations. That is, the devices found are correlated to a destination the vehicle went to while the device was found in the car. If the vehicle doors are opened and then a device is gone, the system assumes that this destination belongs to the person with that particular device and stores this information for future use.

In another example, one or more of the sensors may be used to determine whether a vehicle is being used for personal use or business-related use. For example, if sensors detect that the sun roof is open, it is more likely that the vehicle is currently being used for a road trip/joy ride and less likely that the vehicle is being used for a business related trip or for going to work. Additionally, the system may detect whether the gear shift/suspension is in sport mode, to what station the radio is tuned (e.g., NPR v. music station), or to what volume the speakers are set. All of this information can be used to detect whether the vehicle is being used for business-related or personal use.

Based on the reading of the plurality of sensors, a likelihood can be assigned to each of the supported usage scenarios. For each of these scenarios, the system can determine a different set of destinations/routes and weigh their likelihood. The overall most likely destinations/routes are then presented to the user to pick from, confirm or decline, respectively.

As detailed above, the system can also take historic data into account. For example, if a user has previously brought someone from a certain starting location to a certain destination (e.g., bring kids from home to school), it is more likely that later that day one will also pick them up and bring them back to the starting location. This is especially true if the system determines that the destination/location is a school, daycare, etc.

The method and system detailed above is able to take into account events/incidents that occurred before the driver starts a journey (and during the journey). Those incidents include, for example, whether one door is opened, whether two doors opened (three, four . . . ), including information on which side the door is opened (i.e., to determine if the driver is only putting his jacket in the car or is somebody else entering the car), the number of passengers that opened the doors (tied to doors and seat occupancy), whether the trunk was opened (if it is a specific time/day, e.g. Saturday morning the user might have put in his golf bag in the trunk à destination Golf Course), whether are children/adults (which ones?) sitting in the seats etc. Additionally, in another aspect, a vehicle camera (interior) can be provided to detect more information that could be used for the prediction algorithm (e.g., what is placed on the rear seat (luggage, shopping bag, a coat, . . . )).

With those incidents, the spontaneous prediction algorithm can be optimized for better predictions (e.g. destination in the morning at 7:30 am will be work or if another person entered the vehicle à destination might be likely school and next destination work). This prediction is done with the help of the historical database in trying to detect a pattern. If a new destination is detected by the system, all the events/incidents that were occurring are saved in the database 126 (short/longterm 126a/126b). For example, the user has connected a trailer, has opened the trunk, opened the sunroof, stopped at the Gas Station. The system is able to determine that the user is hauling his boat (or other object) to the lake. At the destination, all of the incidents are saved in relation to this destination. In another example, it is Friday, it is after 6 pm, the driver tunes to a specific radio station/listens to music (of a specific style) from his connected phone, makes a phone call (to the number . . . ) shortly after leaving. The system can determine that it is likely the driver is going to see his friend/girlfriend. If the user does not make a phone call, it might be equally likely (based on his historical pattern), that he wants to go shopping at, for example, the grocery store.

If the system recognizes a specific situation/destination, the user could also be asked "Would you like to choose the (historical) settings to destination X"? (e.g., a predefined profile based on historical data). The system can then, for example, remind the user with his trailer connected on the way to the lake, to stop at the gas station to get gas (or even identify a specific gas station), stop at the grocery store (to get food and drinks), make a call to a certain position, tune radio station to XZZ, etc.

For example, in FIG. 2A, the system, along feed back path 128 from the vehicle systems 122 to the control unit 128, detects, samples and saves the incidents in the database 126. In the user interface 122, the user can also decline a predicted destination (through feedback path 129 from the user interface 122 to the control unit 118). By doing this, another destination or the set of destination the grocery store he is very likely going to visit his friend/girlfriend. Especially, when the system is trained to new situations/destinations the user can speed up the learning process by denying suggested destinations. Alternatively, if the user enters a new destination, the vehicle system is recording all incidents (radio, open sunroof, opened trunk etc.) to correlate later trips to this situation leading to a better (spontaneous) prediction.

The method 300 and system 100 of the invention, described above, may be implemented in a typical computer hardware configuration, which may be incorporated into the vehicle (or may be incorporated into the existing vehicle navigation system and/or overall vehicle computer system). Additionally, a different aspect of the invention includes a computer-implemented method for performing at least certain steps in the above method. Such a method may be implemented, for example, by operating a computer, as embodied by a digital data processing apparatus, to execute a sequence of machine-readable instructions. These instructions may reside in various types of storage media. Thus, this aspect of the present invention is directed to a programmed product, including storage media (or a storage device) tangibly embodying a program of machine-readable instructions executable by a digital data processor to perform the above method.

This storage media may include, for example, a RAM contained within the CPU, as represented by the fast-access storage for example. Alternatively, the instructions may be contained in another storage media, such as a magnetic data storage diskette, compact disc, or other removable storage media/device, directly or indirectly accessible by the CPU.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A system, comprising:
a sensor configured to detect vehicle data;
a situation detection unit configured to receive the vehicle data from the sensor and to determine a plurality of common usage scenarios based on the vehicle data, the situation detection unit configured to determine and assign a likelihood value for the plurality of common usage scenarios;
a navigation system control unit configured to receive the vehicle data from the sensor and the plurality of common usage scenarios and the likelihood value from the situation detection unit, and the navigation system control unit is configured to predict a most likely usage scenario from the plurality of common usage scenarios and determine a set of destinations for the predicted most likely usage scenario;
a user interface configured to display the predicted most likely usage scenario to a user and configured to receive user input such that the user is able to confirm the predicted most likely usage scenario; and
a historical database containing vehicle data for prior vehicle trips and a reliability value for prior predictions,
wherein when the user confirms the predicted most likely usage scenario, the historical database is configured to update the reliability value, and wherein when the user confirms the predicted most likely usage scenario the system applies settings, corresponding to the predicted most likely usage scenario, to in-vehicle systems.

2. The system according to claim 1, wherein the sensor comprises a plurality of sensors configured to detect a variety of vehicle data.

3. The system according to claim 1, wherein the in-vehicle systems comprise a vehicle navigation system and other in-vehicle systems.

4. The system according to claim 2, wherein the plurality of sensors are configured to detect external vehicle data and passenger usage parameters.

5. The system according to claim 1, wherein the system applies a weight to each destination in the set of destinations based on a likelihood that the destination matches a particular common usage scenario.

6. The system according to claim 5, wherein the system determines the weight based on data stored in the historical database.

* * * * *